(12) United States Patent
Miyanaga

(10) Patent No.: US 6,817,428 B1
(45) Date of Patent: Nov. 16, 2004

(54) DRILL BIT

(75) Inventor: Masaaki Miyanaga, Hyogo (JP)

(73) Assignee: Kabushiki Kaisha Miyanaga, Hyogo (JP)

( * ) Notice: Subject to any disclaimer, the term of this patent is extended or adjusted under 35 U.S.C. 154(b) by 0 days.

(21) Appl. No.: 10/221,292

(22) PCT Filed: Mar. 15, 2000

(86) PCT No.: PCT/JP00/01555
§ 371 (c)(1),
(2), (4) Date: Jan. 31, 2003

(87) PCT Pub. No.: WO01/68334
PCT Pub. Date: Sep. 20, 2001

(51) Int. Cl.[7] .............................................. E21B 10/44
(52) U.S. Cl. ...................................... 175/323; 175/394
(58) Field of Search ................................ 175/323, 415, 175/420.1, 394

(56) References Cited

U.S. PATENT DOCUMENTS

| 4,225,275 A | | 9/1980 | Elliott | |
|---|---|---|---|---|
| 6,089,337 A | * | 7/2000 | Kleine et al. | 175/394 |
| 6,260,637 B1 | * | 7/2001 | Haussmann et al. | 175/420.1 |
| 6,345,940 B2 | * | 2/2002 | Anjanappa et al. | 408/230 |

FOREIGN PATENT DOCUMENTS

| JP | 61-230806 A1 | 10/1986 |
|---|---|---|
| JP | 63-27209 A1 | 2/1988 |
| JP | 1-117813 A1 | 8/1989 |
| JP | 08-019911 A1 | 1/1996 |
| JP | 08-039319 A1 | 3/1996 |
| JP | 2000-190323 A1 | 7/2000 |

OTHER PUBLICATIONS

International Search Report for international application PCT/JP00/01555 from the JPO dated Jun. 7, 2000 and mailed to agents on Mar. 28, 2002.

* cited by examiner

*Primary Examiner*—William Neuder
(74) *Attorney, Agent, or Firm*—Marshall, Gerstein & Borun LLP

(57) ABSTRACT

An object of the present invention is to provide a drill bit capable of easily drilling a drill hole that has no rifling, and has high circularity, can be easily positioned, the drill bit comprising a cutting blade tip which is composed of a block body of cemented carbide, three cutting blade portions are formed circumferentially equidistantly around the cutting blade tip, a connection line between a cutting surface 5 and a flank surface 6, said cutting and flank surfaces being formed in each said cutting blade portion 4a, 4b, 4c, acts as a main cutting edge 8 whereas a connection line between a connection surface 7 and said flank surface 6 acts as an auxiliary cutting edge 9, said main cutting edges 8 and said auxiliary cutting edges 9 cross at a blade tip point 10 so that said blade tip point 10 is shaped like a peak with no chisel edge, each said auxiliary cutting edge 9 lies on a line extending from said main cutting edge 8 of a said cutting blade portion located opposite across said blade tip point 10, and each of said main cutting edge 8, said auxiliary cutting edge 9, and a connection line between said connection and cutting surfaces 7, 5 crossing at said blade tip point 10 extends in a straight line.

17 Claims, 3 Drawing Sheets

DRILL BIT

TECHNICAL FIELD

The present invention relates to a drill bit that includes a cemented carbide cutting blade tip united tightly to a bit body leading end of the drill bit by brazing or other welding technique. More particularly, this invention relates to a drill bit adapted to drill a hole in materials such as concrete, stone, and so forth.

BACKGROUND ART

In drilling holes in materials such as concrete and stone, a special drill bit is attached to a rotary hammer drilling machine, and cutting by rotation and drilling by action of simultaneous application of a vibrational striking force in axial direction and a rotational torque is carried out. And, in order to meet the demand for higher efficiency in such a type of drilling work, drill bits of the type having a cutting blade tip of cemented carbide superior in resistance to abrasion which is united tightly to a leading end side of a bit body of the drill bit by brazing, welding, or the like, have been used extensively. For example, Japanese Patent Kokai Publication No. H07-180463 discloses one such cutting blade tip being provided at a bit body leading end. The cutting blade tip is rectangular in cross section. Main cutting edges are formed along one diagonal of the rectangle, whereas auxiliary cutting edges are formed along the other diagonal. The two main cutting edges arranged symmetrically with the shaft center are connected together in a continuous manner so as to form a chisel edge at the top thereof.

However, drilling (cutting) a hole with conventional drill has the following drawbacks.

That is, with respect to drilling by means of a drilling machine, the drill fatefully has flexural and torsional rigidity limitations, and the resulting drill hole has accuracy limitations. Further, the drill has, at its cutting blade tip central portion, a chisel edge. Therefore, when the drill leading end is subjected to cutting resistance during drilling operation, the drill is placed in such a state that it becomes relatively flexible and, as a result, each end of the chisel edge alternately becomes a momentary rotational center of the drill bit. In such a case, since the length of the chisel edge is constant, the chisel edge forms a cutting locus shaped like an equilateral polygon that always includes an isosceles triangle between diagonals, i.e., an equilateral polygon such as an equilateral triangle, an equilateral pentagon, and so forth. Due to this, a rifle will be produced in the drill hole wall. That is, there occurs rifling, resulting in the drop in drill hole quality.

For example, if a rotary hammer drilling machine provided with a drill bit having, at its cutting blade tip center, a chisel edge, is used to drill anchor bolt holes for the fixing of a structure in concrete solidified, this results in the occurrence of rifling. Therefore, there is a deterioration in drill hole roundness and it is impossible to obtain holes of constant diameter suitable for the planting of anchor bolts. Because of this, there is a deterioration in post-planting anchor bolt drawing strength.

Furthermore, with a drill bit having a chisel edge, its drilling center changes while the drill bit is revolving. Therefore, drill hole positioning is difficult to perform, which also results in the drop in drilling accuracy.

DISCLOSURE OF THE INVENTION

In order to provide solutions to the foregoing drawbacks, the present invention provides a drill bit comprising a cutting blade tip which is composed of a block body of cemented carbide. The drill bit is characterized in that: three cutting blade portions are formed circumferentially equidistantly around the cutting blade tip; a connection line between a cutting surface and a flank surface, the cutting and flank surfaces being formed in each the cutting blade portion, acts as a main cutting edge whereas a connection line between a connection surface and the flank surface acts as an auxiliary cutting edge; the main cutting edges and the auxiliary cutting edges cross at a blade tip point so that the blade tip point is shaped like a peak with no chisel edge; each auxiliary cutting edge lies on a line extending from the main cutting edge of a cutting blade portion located opposite across the blade tip point; and, each of the main cutting edge, the auxiliary cutting edge, and a connection line between the connection and cutting surfaces crossing at the blade tip point extends in a straight line.

Unlike conventional drill bits for which chisel edges have been deemed essential from the structural aspect, the drill bit of the present invention constructed in the way as described above has no chisel edge. Such arrangement makes it possible to provide holes of improved roundness without the occurrence of rifling to holes being drilled. Particularly, when employing a rotary hammer drilling machine using a drill bit of the present invention to drill anchor bolt planting holes for the fixing of a structure in concrete solidified, no rifling will occur in a hole being drilled, thereby not only providing a better rotational balance but also providing a drill hole of improved roundness, because the drill bit has no chisel edge and each cutting blade portion has a main cutting edge and an auxiliary cutting edge wherein the main cutting edge and the auxiliary cutting edge cross each other at a blade tip point so that the blade tip point is shaped like an peak. Further, since the blade tip point having such a peak-like structure always lies in the center of a drill hole cutting surface, this facilitates positioning and makes it possible to drill a high-accuracy constant-diameter hole whose hole diameter error is held so as not to exceed the allowed value, even when performing drilling that accompanies a cutting operation in which the blade tip momentarily surfaces from the drill hole cutting surface and immediately thereafter starts knocking impactingly, and excellent operating performance is obtained.

Furthermore, in drilling a hole in material such as concrete, stone, and so forth, a cutting surface at the drill hole leading end in course of drilling forms an uneveness rough surface, and chips are also left thereabove. Accordingly, at the time of impact cutting, chip lumps can be caught between the drill hole cutting surface and the drill bit blade tip. In such a case, the drill bit blade tip is subjected to bias resistance and looses its rotational balance, which can contribute to drill bit run-out. However, it is arranged in the present invention such that each auxiliary cutting edge lies on a line extending from the main cutting edge of a cutting blade portion located opposite across the blade tip point, as a result of which arrangement the main cutting edges and the auxiliary cutting edges formed in the three cutting blade portions are alternately arranged at equal intervals of an angle of 60 degrees, extending radially from the blade tip point. Therefore, at the time of impact cutting, a main cutting edge and its adjacent auxiliary cutting edge cooperate to effectively grind chip lumps caught between a cutting surface at the drill hole leading end and the blade tip. This reduces bias resistance that the: blade tip receives. Drill bit run-out is eliminated, thereby providing holes of high accuracy.

Further, because of the arrangement that each of the main cutting edge, the auxiliary cutting edge, and the connection line between the connection and cutting surfaces crossing each other at the blade tip point extends in a straight line, the finishing accuracy of an entire blade tip can be enhanced in the manufacture of a drill bit, thereby making it possible to provide high-quality drill bit products.

Further, the concave entrance portions formed between respective cutting blade portion and the next are so arranged as to continuously extend to their corresponding chip ejection grooves of the drill body, respectively. It is preferable that: a surface of a concave entrance portion formed between each the cutting blade portion comprises a single continuous surface made up of a circular arc surface and flat surfaces continuous with ends of the circular arc surface; a surface of the concave entrance portion corresponding to the connection surface serves as the circular arc surface; and a radius of curvature of the circular arc surface of the concave entrance portion is set such that, on the side of the cutting surface, an end of the connection line between the connection surface and the cutting surface crosses the circular arc surface of the concave entrance portion at a point between edges of the circular arc surface whereas, on the side of the flank surface, an end of the auxiliary cutting edge crosses an edge end of the circular arc surface of the concave entrance portion. As a result of such arrangement, when used in drilling a hole in materials such as concrete, stone, and so forth, chips cut are smoothly guided to a chip ejection groove of the drill body by way of a corresponding concave entrance portion and are ejected therefrom. Accordingly, no chip will linger in the blade tip portion, thereby achieving improvement in drilling efficiency.

Further, the following are preferable settings for drill bits suitable for drilling holes in materials such as concrete, stone, and so forth. Preferably, a circumferential thickness at a cutting blade portion end of each cutting blade portion is set so as to be from about 0.2 to 0.5 times as great as a blade tip diameter. And, a circumferential apparent width of the cutting surface of each cutting blade portion is preferably set such that the circumferential apparent width is from about 0.2 to about 0.5 times as great as the circumferential thickness. As a result of these settings, in performing drilling work that accompanies impact cutting, it is possible to hold the strength of a cutting blade tip at sufficiently high levels, thereby providing stable drilling operations.

Furthermore, the following are preferable settings for drill bits suitable for drilling holes in materials such as concrete, stone, and so forth. Practically, a core diameter of the bit body is set such that the core diameter is from about 0.3 to about 0.7 times as great as the blade tip diameter, and a tip height at each cutting blade portion end is set such that the tip height is about 0.2 to about 0.5 times as great as the blade tip diameter. As a result of such settings, in performing drilling work that accompanies impact cutting, the sliding contact resistance between an outer peripheral surface of the cutting blade portion and a drill hole wall is reduced, thereby improving not only drilling efficiency but also drilling accuracy.

Furthermore, a concave portion for blade tip diameter abrasion confirmation may be provided in an outer peripheral surface of each cutting blade portion. As a result of such arrangement, it is possible to visually confirm abrasion of the concave portion. The advance of abrasion of the cutting blade tip can be confirmed at a glance, thereby enabling an operator to easily drill constant-diameter holes whose hole diameter error is held so as not to exceed the allowed value without having to use a special measuring tool or the like. For example, if such a hole drilled in materials such as concrete, stone, and so forth is used for the planting of an anchor bolt, this provides high post-planting anchor bolt drawing strength.

BEST MODE FOR CARRYING OUT THE INVENTION

Hereinafter, an exemplary embodiment of the present invention will be described by making reference to the accompanying drawing figures. The present invention is of course not limited to the exemplary embodiment.

Figure 1:
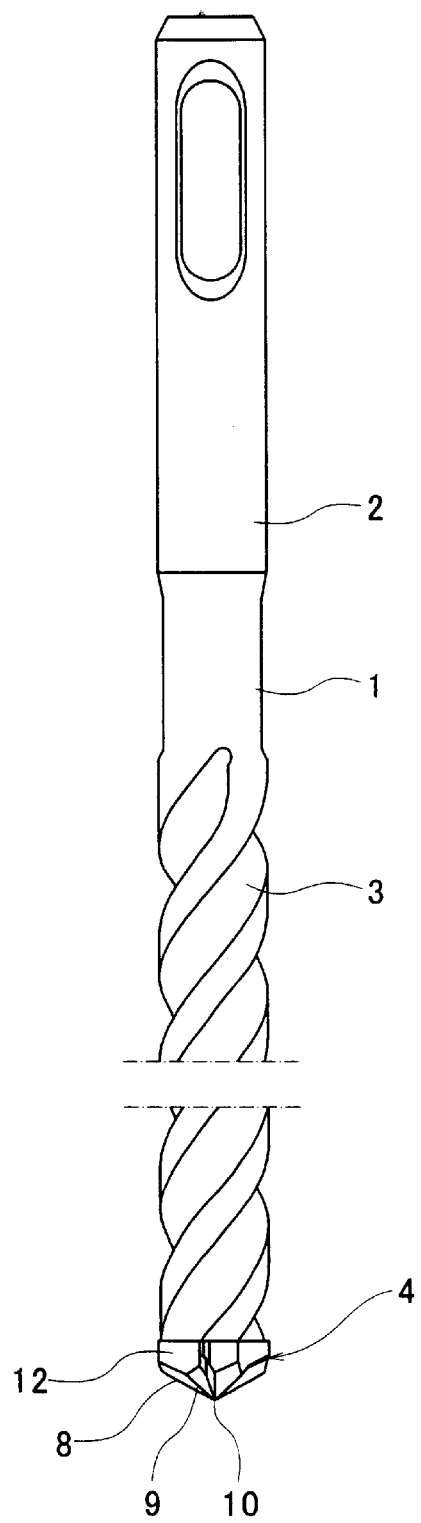
FIG. 1 is a front view of a drill bit according to one embodiment of the present invention with part of the drill bit not shown.

Referring to FIG. 1, the reference numeral 1 denotes a bit body made of steel. The bit body 1 has, at its upper part, a shank 2 to which a driving shaft (not shown) is attached. Further, a chip ejection groove 3 is formed on an outer periphery of the bit body, and a cutting blade tip 4, comprised of a cemented carbide block body, is united tightly to an leading end of the bit body by blazing or other welding technique.

Figure 2:
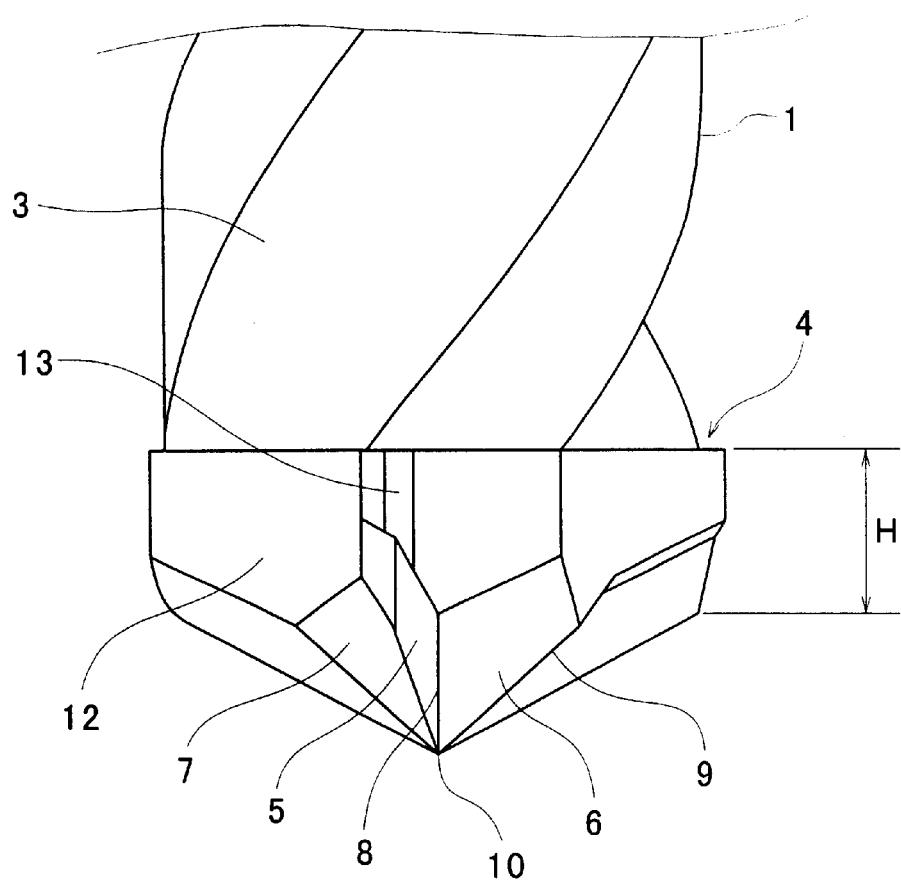
FIG. 2 is an enlarged front view of a blade tip portion of the drill bit shown in FIG. 1.
Figure 3:
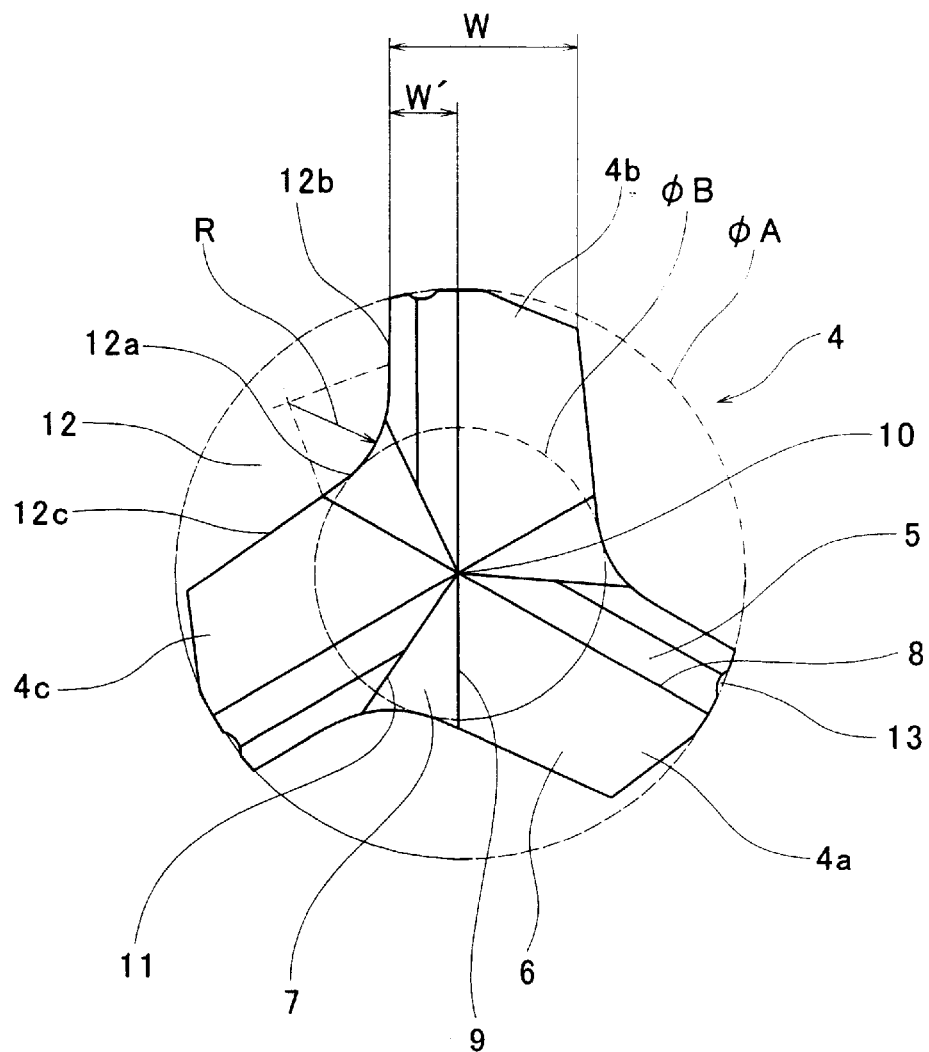
FIG. 3 is a bottom view of the blade tip portion of the drill bit shown in FIG. 1 when viewed from the lower end thereof.

Referring to FIGS. 2 and 3, the cutting blade tip 4 of the present embodiment will be described in greater detail. Three cutting blade portions 4a, 4b, 4c are circumferentially equidistantly formed on the cutting blade tip 4, in other words these cutting blade portions 4a, 4b, 4c are an angle of 120 degrees apart from each another, as shown in FIG. 3. The cutting blade portions 4a, 4b, 4c each have a cutting surface 5 and a flank surface 6. Between each cutting blade portion 4a, 4b, 4c and the next, a connection surface 7 is formed between the flank surface 6 and the cutting surface 5. And, in each cutting blade portion 4a, 4b, 4e, a connection line defined between the cutting surface 5 and the flank surface 6 forms a main cutting edge 8, and a connection line defined between the flank surface 6 and the connection surface 7 forms an auxiliary cutting edge 9. Further, the main cutting edges 8 and auxiliary cutting edges 9 of the cutting blade portions 4a, 4b, 4c cross each other at a blade tip point 10 so that the blade tip point 10 is shaped like a peak with no chisel edge.

Further, each of the main cutting edge 8, the auxiliary cutting edge 9, and the connection line 11 defined between the connection surface 7 and the cutting surface 5 which cross each other at the blade tip point 10 extends in a straight line. In other words, the auxiliary cutting edge 9 lies on a line extending from the main cutting edge 8 of a cutting blade portion located opposite across the blade tip point 10.

To sum up, the three main cutting edges 8 and the three auxiliary cutting edges 9, these six cutting edges together forming a blade tip of the drill bit, are alternately equidistantly formed so that they are an angle of 60 degrees apart from each other and extend radially from the blade tip point 10.

Furthermore, concave entrance portions 12 are defined between each cutting blade portion 4a, 4b, 4c and the next, continuously extending to their corresponding chip ejection grooves 3, respectively. A surface of each concave entrance portion 12 (i.e., a wall surface of each concave entrance portion 12 when viewed from the bottom) comprises a single continuous surface made up of a circular arc surface 12a and flat surfaces 12b and 12c) continuous with sides of the circular arc surface 12a. And, the flat surface 12b is so arranged as to be in parallel with the main cutting edge 8 on the side of the cutting surface 5, and a surface of the concave entrance portion corresponding to the connection surface 7 serves as the circular arc surface 12a. The radius of curvature R of the circular arc surface 12a is set as follows. That is, the radius of curvature R of the circular arc surface 12a is set in such a way that, on the side of the cutting surface 5, an end of the connection line 11 defined between the connection surface 7 and the cutting surface 5 crosses the circular arc surface of the concave entrance portion at a halfway point of an edge line of the circular arc surface whereas, on the side of the flank surface 6, an end of the auxiliary cutting edge 9 crosses an edge end of the circular arc surface of the concave entrance portion.

Furthermore, other dimension relationships in parts of the blade tip are set as follows:

(1) The circumferential thickness W at a cutting blade end of each cutting blade portion 4a, 4b, 4c is so set as to be from about 0.2 to about 0.5 times as great as the blade tip diameter ΦA (see FIG. 3).

(2) The circumferential apparent width W' of the cutting surface 5 of each cutting blade portion 4a, 4b, 4c is so set as to be from about 0.2 to about 0.5 times as great as the circumferential thickness W at the cutting blade end of each cutting blade portion 4a, 4b, 4c (see FIG. 3).

(3) The core diameter ΦB of the bit body 1 is so set as to be from about 0.3 to about 0.7 times as great as the blade tip diameter ΦA (see FIG. 3).

(4). The tip height H at each cutting blade portion end is so set as to be from about 0.2 to about 0.5 times as great as the blade tip diameter ΦA (see FIG. 2).

Finally, a concave portion 13 for blade tip diameter abrasion confirmation is provided in an outer peripheral surface of each cutting blade portion 4a, 4b, 4c.

[Industrial Applicability]

The present invention provides a drill bit most suitable for drilling holes in materials such as concrete, stone, and so forth.

The present invention is embodied in the above-described manner. However, in a drill bit of the present invention, the basic configuration of its bit body such as a shank is the same as that of this type of drill bit known in the art. Therefore, the drill bit of the present invention can be used just by replacement with a conventional drill bit.

Additionally, in accordance with the drill bit of the present invention, three cutting blade portions which are circumferentially equidistantly formed around a cutting chip. Unlike conventional drill bits for which chisel edges have been deemed essential from the structural aspect, the drill bit of the present invention constructed in the way as described above has no chisel edge. As a result of such arrangement, when drilling holes with a drill bit of the present invention, there occurs no rifling to a drill hole during drilling. Further, the present drill bit provides a better rotational balance, thereby making it possible to drill holes of high roundness.

Furthermore, since the blade tip point having a peak-like structure always lies at the cutting surface center of a drill hole leading end, this facilitates positioning and, in addition, makes it possible to drill high-accuracy constant-diameter holes whose hole diameter error is held so as not to exceed the allowed value, even when performing drilling that accompanies a cutting (impact cutting) operation in which the blade tip momentarily surfaces from the cutting surface of the drill hole leading end and immediately thereafter starts knocking impactingly.

Further, even when chip lumps are caught between the cutting surface at the drill hole leading end and the blade tip during impact cutting, a main cutting edge and its adjacent auxiliary cutting edge work together to grind the chip lumps. This reduces bias resistance that the blade tip will receive, and there is no drill bit run-out during drilling, thereby improving the accuracy of drilling a hole.

Furthermore, the provision of the concave portion for confirming blade tip diameter abrasion makes it possible to confirm, at a glance, the advance of cutting blade tip abrasion from the degree of abrasion of the concave portion, thereby enabling an operator to easily drill constant-diameter holes whose hole diameter error is held so as not to exceed the allowed value without having to use a special measuring tool or the like.

Accordingly, the present invention provides a drill bit which can be used suitably as a drill bit for rotary hammer drills for drilling anchor bolt holes for the fixing of a structure in concrete solidified, and the use of such a hole for the planting of an anchor bolt provides higher anchor bolt drawing strength in comparison with the case where an anchor bolt is planted in an anchor bolt planting hole drilled by a conventional technique.

What is claimed is:

1. A drill bit comprising a cutting blade tip which is composed of a block body of cemented carbide characterized in that:

three cutting blade portions are formed circumferentially equidistantly around said cutting blade tip;

a connection line between a cutting surface and a flank surface, said cutting and flank surfaces being formed in each said cutting blade portion, acts as a main cutting edge whereas a connection line between a connection surface and said flank surface acts as an auxiliary cutting edge, said main cutting edges and said auxiliary cutting edges cross at a blade tip point so that said blade tip point is shaped like a peak with no chisel edge, each said auxiliary cutting edge extending along a line defined by a respective main cutting edge of a corresponding cutting blade portion, such that said auxiliary cutting edge is located opposite from, and across said blade tip point from, the respective main cutting edge; and each of said main cutting edge, said auxiliary cutting edge, and a connection line between said connection and cutting surfaces crossing at said blade tip point extends in a straight line.

2. The drill bit as in claim 1 characterized in that:

a surface of a concave entrance portion formed between respective said cutting blade portions comprises a single continuous surface made up of a circular arc surface and flat surfaces continuous with ends of said circular arc surface, a surface of said concave entrance portion corresponding to said connection surface serves as said circular arc surface, and a radius of curvature of said circular arc surface of said concave entrance portion is set such that, on the side of said cutting surface, an end of said connection line between said connection surface and said cutting surface crosses said circular arc surface whereas, on the side of said flank surface, and end of said auxiliary cutting edge crosses an edge end of said circular arc surface of said concave entrance portion.

3. The drill bit as in claim 1 characterized in that:
a circumferential thickness W at a cutting blade portion end of each cutting blade portion is set such that said circumferential thickness W is from about 0.2 to 0.5 times as great as a blade tip diameter ΦA.

4. The drill bit as in claim 1 characterized in that:
a circumferential apparent width W' of said cutting surface of each cutting blade portion is set such that said circumferential apparent width W' is from about 0.2 to about 0.5 times as great as said circumferential thickness W.

5. The drill bit as in claim 1 characterized in that:
a core diameter ΦB of said bit body is set such that said core diameter ΦB is from about 0.3 to about 0.7 times as great as said blade tip diameter ΦA.

6. The drill bit as in claim 1 characterized in that:
a tip height H at each cutting blade portion end is set such that said tip height H is about 0.2 to about 0.5 times as great as said blade tip diameter ΦA.

7. The drill bit as in claim 1 further comprising a concave portion for blade tip diameter abrasion confirmation provided in an outer peripheral surface of each cutting blade portion.

8. The drill bit as in claim 2 characterized in that:
a circumferential thickness W at a cutting blade portion end of each cutting blade portion is set such that said circumferential thickness W is from about 0.2 to 0.5 times as great as a blade tip diameter ΦA.

9. The drill bit as in claim 2 characterized in that:
a circumferential apparent width W' of said cutting surface of each cutting blade portion is set such that said circumferential apparent width W' is from about 0.2 to about 0.5 times as great as said circumferential thickness W.

10. The drill bit as in claim 3 characterized in that:
a circumferential apparent width W' of said cutting surface of each cutting blade portion is set such that said circumferential apparent width W' is from about 0.2 to about 0.5 times as great as said circumferential thickness W.

11. The drill bit as in claim 2 characterized in that:
a core diameter ΦB of said bit body is set such that said core diameter ΦB is from about 0.3 to about 0.7 times as great as said blade tip diameter ΦA.

12. The drill bit as in claim 3 characterized in that:
a core diameter ΦB of said bit body is set such that said core diameter ΦB is from about 0.3 to 0.7 times as great as said blade tip diameter ΦA.

13. The drill bit as in claim 4 characterized in that:
a core diameter ΦB of said bit body is set such that said core diameter ΦB is from about 0.3 to 0.7 times as great as said blade tip diameter ΦA.

14. The drill bit as in claim 2 characterized in that:
a tip height H at each cutting blade portion end is set such that said tip height H is about 0.2 to about 0.5 times as great as said blade tip diameter ΦA.

15. The drill bit as in claim 3 characterized in that:
a tip height H at each cutting blade portion end is set such that said tip height H is about 0.2 to about 0.5 times as great as said blade tip diameter ΦA.

16. The drill bit as in claim 4 characterized in that:
a tip height H at each cutting blade portion end is set such that said tip height H is about 0.2 to about 0.5 times as great as said blade tip diameter ΦA.

17. The drill bit as in claim 5 characterized in that:
a tip height H at each cutting blade portion end is set such that said tip height H is about 0.2 to about 0.5 times as great as said blade tip diameter ΦA.

* * * * *